United States Patent
Marks et al.

(10) Patent No.: US 12,528,928 B2
(45) Date of Patent: Jan. 20, 2026

(54) METHODS FOR DEPOLYMERIZING POLYESTERS

(71) Applicant: Northwestern University, Evanston, IL (US)

(72) Inventors: Tobin J. Marks, Evanston, IL (US); Yanshan Gao, Evanston, IL (US); Yosi Kratish, Evanston, IL (US); Jiaqi Li, Evanston, IL (US)

(73) Assignee: Northwestern University, Evanston, IL (US)

( * ) Notice: Subject to any disclaimer, the term of this patent is extended or adjusted under 35 U.S.C. 154(b) by 696 days.

(21) Appl. No.: 17/915,299

(22) PCT Filed: Apr. 12, 2021

(86) PCT No.: PCT/US2021/026822
§ 371 (c)(1),
(2) Date: Sep. 28, 2022

(87) PCT Pub. No.: WO2021/211423
PCT Pub. Date: Oct. 21, 2021

(65) Prior Publication Data
US 2023/0145136 A1    May 11, 2023

Related U.S. Application Data

(60) Provisional application No. 63/008,948, filed on Apr. 13, 2020.

(51) Int. Cl.
| C08J 11/16 | (2006.01) |
| C07C 51/09 | (2006.01) |
| C08K 3/012 | (2018.01) |
| C08K 3/22 | (2006.01) |

(52) U.S. Cl.
CPC .............. *C08J 11/16* (2013.01); *C07C 51/09* (2013.01); *C08K 3/012* (2018.01); *C08J 2367/02* (2013.01); *C08K 2003/2258* (2013.01)

(58) Field of Classification Search
USPC ........................................................ 521/48
See application file for complete search history.

(56) References Cited

U.S. PATENT DOCUMENTS

| 6,545,061 B1 | 4/2003 | Murdoch |
| 6,649,792 B2 | 11/2003 | Sirek et al. |
| 7,462,649 B2 | 12/2008 | Nakao et al. |
| 7,893,122 B2 | 2/2011 | Fregoso-Infante et al. |
| 2005/0096482 A1 | 5/2005 | Tamada et al. |
| 2005/0218109 A1 | 10/2005 | Semersky et al. |
| 2009/0318579 A1 | 12/2009 | Ikenaga |
| 2017/0152203 A1 | 6/2017 | Essaddam |
| 2019/0112419 A1 | 4/2019 | Li et al. |
| 2019/0161595 A1 | 5/2019 | Charra et al. |

FOREIGN PATENT DOCUMENTS

| JP | 2005350620 A | * 12/2005 |
| WO | WO 2015/190941 A1 | 12/2015 |
| WO | WO 2016/096768 A1 | 6/2016 |
| WO | WO 2017/087752 A1 | 5/2017 |
| WO | WO 2018/007356 A1 | 11/2018 |

OTHER PUBLICATIONS

JP2005350620 see machine translation (Year: 2005).*
T. L. Lohr, A. R. Mouat, N. M. Schweitzer, P. C. Stair, M. Delferro, T. J. Marks, "Efficient catalytic greenhouse gas-free hydrogen and aldehyde formation from aqueous alcohol solutions," *Energy Environ. Sci.* Jul. 2017, vol. 10, No. 7; pp. 1558-1562.
A. R. Mouat, T. L. Lohr, E. C. Wegener, J. T. Miller, M. Delferro, P. C. Stair, T. J. Marks, "Reactivity of a Carbon-Supported Single-Site Molybdenum Dioxo Catalyst for Biodiesel Synthesis," *ACS Catalysis* 2016, 6; pp. 6762-6769.
S. Liu, J. Li, T. Jurca, P. C. Stair, T. L. Lohr, T. J. Marks, "Efficient carbon-supported heterogeneous molybdenum-dioxo catalyst for chemoselective reductive carbonyl coupling," *Catalysis Science & Technology* 2017, 7; pp. 2165-2169.
J. Li, S. Liu, T. L. Lohr, T. J. Marks, "Efficient Chemoselective Reduction of N-Oxides and Sulfoxides Using a Carbon-Supported Molybdenum-Dioxo Catalyst and Alcohol," *ChemCatChem* 2019, 11; pp. 4139-4146.
The International Search Report and Written Opinion issued on Jul. 9, 2021 for international patent application No. PCT/US21/26822; pp. 1-8.
Kandari et al., "Catalytic Hydrogenation Reactions on Molybdenum Oxide," *Modern Research in Catalysis* Jan. 6, 2015, vol. 4; pp. 36-42.
Kratish, Yosi, et al. "Polyethylene Terephthalate Deconstruction Catalyzed by a Carbon-Supported Single-Site Molybdenum-Dioxo Complex." Angewandte Chemie International Edition 59.45 (2020): 19857-19861.
Eric M. Krall et al., "Controlled hydrogenative depolymerization of polyesters and polycarbonates catalyzed by ruthenium{11} PNN pincer complexest," Chem Commun. 2014, vol. 50, No. 38; pp. 4863-4960.
Tracy L. Lohr et al., "Thermodynamically Leveraged Tandem Catalysis for Ester RC{O}OR Bond Hydrogenolysis. Scope and Mechanism," ACS Catalysis 2015, 5, pp. 3675-3679.
Tracy L. Lohr et al., "Mono- and tri-ester hydrogenolysis using tandem catalysis. Scope and mechanismt," Energy Environ. Sci, 2016, 9; pp. 550-564.

* cited by examiner

Primary Examiner — Terressa Boykin
(74) Attorney, Agent, or Firm — Bell & Manning, LLC (57) ABSTRACT

A method for depolymerizing a polyester may comprise heating a polyester at a temperature and for a period of time in the presence of a supported metal-dioxo catalyst, optionally, in the presence of $H_2$, to induce hydrogenolysis of ester groups in the polyester and provide monomers of the polyester.

20 Claims, 7 Drawing Sheets

METHODS FOR DEPOLYMERIZING POLYESTERS

CROSS-REFERENCE TO RELATED APPLICATIONS

The present application claims priority to U.S. provisional patent application No. 63/008,948 that was filed Apr. 13, 2020, the entire contents of which are incorporated herein by reference.

REFERENCE TO GOVERNMENT RIGHTS

The present application is a National Stage of International Application No. PCT/US21/26822, filed Apr. 12, 2021, which claims priority to U.S. provisional patent application No. 63/008,948 that was filed Apr. 13, 2020, the entire contents of both of which are incorporated herein by reference.

BACKGROUND

Polymer-based plastics are among the most widely used synthetic materials worldwide and have become essential materials for modern life and the global economy. Their annual production is increasing and expected to reach about 1.12 billion tons by 2050. Since almost all plastics are produced from fossil feedstocks their impact on the depletion of our finite natural resources is a concern, as is the large accumulation of waste plastics and their worldwide environmental consequences. The principal reason for this accumulation reflects a linear economic model in which most plastic products are discarded after use. In contrast, a circular plastic economy in which waste products are recycled and reused for the subsequent production of polymers, chemical feedstocks, and liquid fuels, is far more rational.

SUMMARY

Provided are methods for depolymerizing polyesters.

In an embodiment, a method for depolymerizing a polyester comprises heating a polyester at a temperature and for a period of time in the presence of a supported metal-dioxo catalyst to induce hydrogenolysis of ester groups in the polyester and provide monomers of the polyester. In embodiments, the method is carried out in the presence of $H_2$.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Provided are methods for depolymerizing polyesters. The methods involve heating a polyester at a temperature and for a period of time in the presence of certain catalysts and, in embodiments, hydrogen (H$_2$) to induce hydrogenolysis of ester groups in the polyester and provide monomers of the polyester. By contrast to existing depolymerization methods, the catalysts in the present methods are earth-abundant, air- and moisture-stable, non-toxic, and recyclable. In addition, the methods may use mild pressures (e.g., 1 atm H$_2$) and do not require any solvent. The monomeric products may be generated in very high yields (e.g., 90%).

The polyesters to be depolymerized by the methods are polymers composed of monomers covalently bound into an extended chain via ester groups. The polyesters may be those which are formed by reacting an organic diol (HOROH) with a dicarboxylic acid (HOOCR'COOH) to provide the ester linking groups. In other words, the polyesters are the polymerization product of reactants comprising such an organic diol and such a dicarboxylic acid. Thus, depending upon the type of organic diol and the type of dicarboxylic acid (i.e., depending upon R and R') a variety of polyesters are encompassed. The monomeric products produced by the methods generally comprise these starting dicarboxylic acids, which may be recovered and used in further syntheses. Rather than a diol, the secondary products generally comprise an alkene corresponding to the starting organic diol. This means the organic diol with the hydroxyl groups replaced by carbon-hydrogen bonds.

Regarding the dicarboxylic acid, R' in HOOCR'COOH may be an aromatic group or a heterocyclic group. The aromatic group may be substituted or unsubstituted. By "substituted," it is meant that one or more bonds to a carbon(s) or hydrogen(s) are replaced by a bond to non-hydrogen and non-carbon atoms. By way of illustration, R' may be an aromatic group comprising one or more connected or fused benzene rings. As another illustration, R' may be a heterocyclic group such as a furan. If R' is or includes a benzene ring(s), the carboxylic groups may be on the same benzene ring or on different benzene rings. If the carboxylic groups are on the same benzene ring, they be in an ortho, meta, or para relationship. If R' is or includes a heterocyclic group such as a furan, the carboxylic groups may be on neighboring or non-neighboring carbons of the ring. As noted above, the monomeric products produced by the methods generally comprise these starting dicarboxylic acids.

Regarding the organic diol, this compound may be an aliphatic diol. R in HOROH may be a linear, branched, or cyclic aliphatic group. The aliphatic diol may be substituted or unsubstituted. The hydroxyl groups may be on the same carbon atom, adjacent carbon atoms, or non-adjacent carbon atoms. As noted above, secondary monomeric products produced by the methods generally comprise an alkene corresponding to these starting organic diols.

In embodiments, the polyester to be depolymerized in the methods has the formula —[OC(O)ArC(O)OR]$_n$— wherein Ar is benzene; a heterocycle; a fused ring structure comprising benzene, a heterocycle, or both; a connected ring structure comprising benzene, a heterocycle, or both; and wherein R is a linear, branched, cyclic aliphatic group, or a substituted diol. The number of carbons in the aliphatic group may be in the range of from 2 to 20. The value of n may be in the range of from 5 to 5000.

Illustrative polyesters to be depolymerized in the methods include polyethylene terephthalate (PET), polybutylene terephthalate (PBT), polytrimethylene terephthalate (PTT), polyethylene naphthalate (PEN), and polyethylene 2,5-furandicarboxylate (PEF). These particular polyesters are homopolymers, but the polyester to be depolymerized may also be a copolymer, e.g., polyethylene terephthalate glycol-modified (PETG) and poly(1,4-cyclohexylenedimethylene terephthalate) (PCT).

Taking PET as an example, the methods depolymerize PET to produce terephthalic acid and ethylene.

The temperature and period of time used in the method may be adjusted in order to promote hydrogenolysis/depolymerization and thus, to achieve a desired (e.g., maximum) yield of monomer, e.g., the starting dicarboxylic acid. However, the temperature is generally near the melting temperature of the polyester. Thus, the specific temperature used depends upon the polyester. For PET, for example, the temperature may be at least 240° C., at least 250° C., at least 260° C., at least 270° C., or in a range of from 200° C. to 600° C. The period of time also depends upon the polyester, but illustrative times include at least 1 hour, at least 2 hours, at least 4 hours, at least 8 hours, at least 12 hours, at least 18 hours, at least 24 hours, at least 36 hours, at least 48 hours, or in a range of from 1 hours to 48 hours. The method is generally conducted under a hydrogen atmosphere, but other gases may be included. The $H_2$ pressure may be adjusted in order to achieve a desired (e.g., maximum) yield of monomer. The $H_2$ pressure may be no more than 50 atm, no more than 25 atm, no more than 10 atm, or in a range of from 1 atm to 10 atm, from 1 atm to 100 atm, or from 1 atm to 500 atm. In other embodiments, $H_2$ is not used. For example, the method may be carried out under an inert atmosphere, using an inert gas, e.g., Ar. The method is generally carried out without using any solvent. As such, the method may be referred to as being "solvent-free" and the like.

The method makes use of certain catalysts. The catalysts are supported metal-dioxo catalysts, which are prepared from a molecular precursor. Such a catalyst comprises metal-dioxo moieties covalently bound to an oxygen-containing or an oxygen-functionalized support. (See FIG. 5A, steps i-viii.) The oxygen-containing support may be a metal oxide. The oxygen-functionalized support may be a carbonaceous support such as activated carbon. The metal may be a Group 6 transition metal, e.g., chromium, molybdenum, tungsten. The amount of the metal-dioxo moiety in the catalyst may vary, but in embodiments, the amount is in a range of from 0.1 weight % to 10 weight % (as compared to the total weight of catalyst being used). The amount of the catalyst used in the method may also vary, but in embodiments, the amount is in a range of from 0.0001 weight % to 100 weight % (as compared to the total weight of catalyst and polyester being used). This includes from 0.001 weight % to 90 weight %, from 0.01 weight % to 85 weight %, from 1 weight % to 85 weight %. The mol ratio of ester groups in the polyester to metal in the catalyst may range from 200:1 to 20:1, from 175:1 to 30:1, and from 160:1 to 40:1. When a carbonaceous material is used as the support, the supported metal-dioxo catalyst may be referred to in the present disclosure as C/MO$_2$ or "single-site C/MO$_2$" or the like. Such a catalyst may be formed by direct grafting of (dimethoxyethane)MO$_2$X$_2$, wherein M is a metal and X is Cl, Br, or I, onto the selected support as described in U.S. application Ser. No. 15/487,017, now U.S. Pat. No. 10,435,343, which is hereby incorporated by reference in its entirety. Prior to use in the methods, the catalysts may be dried by heating in vacuum as described in the Example, below. Similarly, the polyesters may be dried prior to use as described in the Example, below.

The method may be carried out using a variety types of reactor systems, including batch reactor systems, semi-batch reactor systems, and continuous flow reactor systems.

The method may further comprise recovering the catalyst from the reaction mixture which includes the monomers and possibly, unreacted polyester and/or other depolymerized polyester fragments. No solvent is required for recovery of the catalyst. The recovered catalyst may be used to carry out the method one or more additional times. Similarly, the monomers may be recovered and used for any desired purpose, including synthesizing new polymer, including a new polyester. Recovery of the monomers may be by vaporization or sublimation.

The method may be characterized by a yield of monomer, including yield of the starting dicarboxylic acid. The yield is reported as (weight of monomers)/(starting weight of polyester)*100%. The yield may be determined using $^1$H NMR as described in the Example below. The yield may be an initial yield obtained by using fresh (i.e., unused) catalyst. The initial yield may be at least 70%, at least 75%, at least 80%, at least 85%, at least 90%, at least 95%, at least 98%, or in a range of from 70% to 100%. The yield may be a yield obtained by using recovered catalyst which has been used one or more times (e.g., 1, 2, 3, 4, etc.). The yield from a recycled/recovered catalyst may be within +20%, +10%, +5%, or ±2% of the initial yield. Any of the yield values in this paragraph may refer to a specific polyester (e.g., PET), a specific monomer (e.g., terephthalic acid) and the method carried out at a specific temperature (e.g., 260° C.), for a specific time (e.g., 24 hours), and under a specific atmosphere (e.g., 1 atm $H_2$).

It is noted that the results obtained by using the present methods as described in the Example below are both surprising and unexpected, particularly in view of the fact that the catalyst has not previously been successfully used with any polymer, polyester, aromatic ester/diester, furanic ester/diester. Also, the catalyst has not previously been successfully used under high temperature conditions. Also, the catalyst has not previously been successfully used in a method in which $H_2$ is a reactant.

The polyester to be depolymerized by the present method may be provided in a mixture with non-polyester polymers, e.g., a polyolefin. The present methods may be used to depolymerize the polyester while leaving the other polymer unchanged. Thus, the present methods provide an elegant way to separate a polyester from such a mixture. In the method, the polyester is deconstructed while leaving the non-polyester polymer intact. The term "intact" does not necessarily mean perfectly intact as a minor amount of the non-polyester polymer may be decomposed.

EXAMPLE

Introduction

Figure 1A:
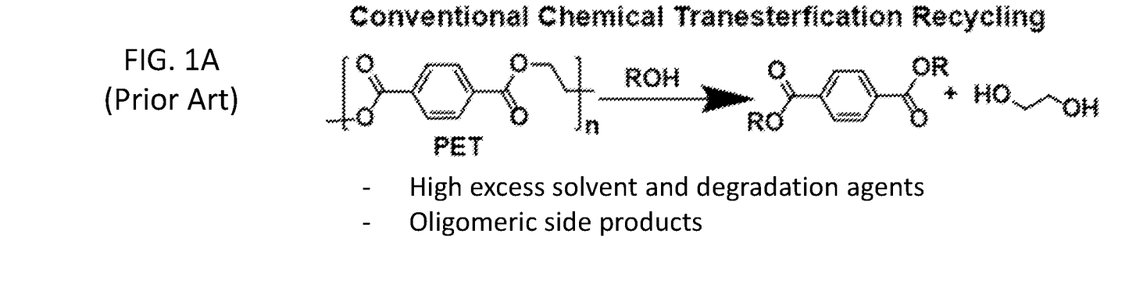
FIGS. 1A-1C show schematics of PET chemical recycling options, including those according to the prior art (FIGS. 1A and 1B) and an illustrative method according to the present disclosure (FIG. 1C).

The most common chemical recycling process for polyesters such as polyethylene terephthalate (PET) is transesterification such as glycolysis, methanolysis, and hydrolysis. This can be catalyzed by heavy metal acetates, titanium complexes, metal chlorides, metallic and metal oxide nanoparticles, and ionic liquids. Furthermore, hydrosilylation and microbial agents have been shown to effect PET depolymerization. A limitation of these processes is formation of oligomeric side products which can be difficult to separate from monomers and the need for large excesses of solvents and degradation agents (FIG. 1A).

Figure 1B:
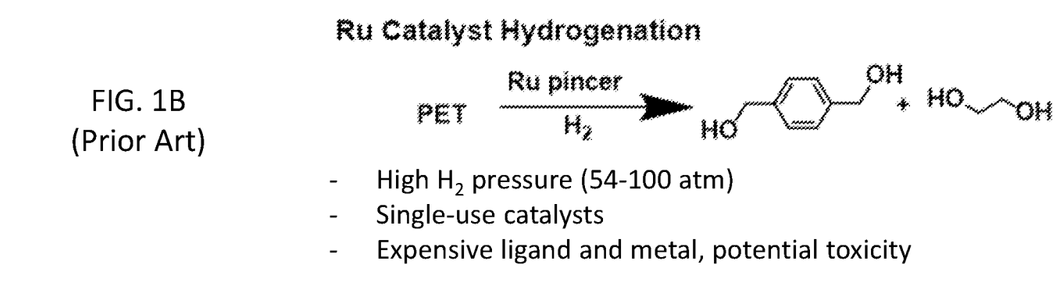

There has been limited research in catalytic hydrogenolysis processes using $H_2$ for deconstructing polyesters. Recently, Ru pincer complexes were reported to catalyze polyester hydrogenolysis to the corresponding alcohols. (S. Westhues, et al. *Science Advances* 2018, 4, eaat9669; J. A. Fuentes, et al. *Chem. Eur. J.* 2015, 21, 10851-10860; E. M. Krall, et al. *Chem. Commun.* 2014, 50, 4884-4887.) Although $H_2$ is a cost-effective reductant, the process requires high $H_2$ pressures (54-100 atm), long reaction times (16-48 h), and expensive and potentially toxic Ru catalysts having complex, hence expensive, ligands (FIG. 1).

Figure 1C:
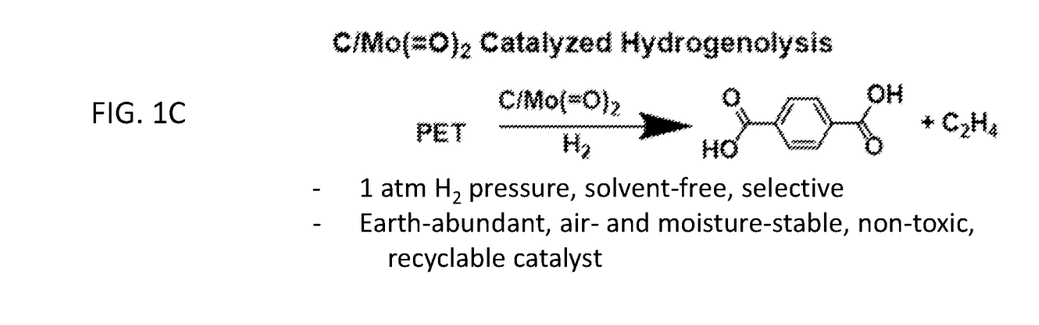

Herein is reported an efficient solventless process for the depolymerization of PET, catalyzed by $C/MoO_2$, yielding the starting monomer, terephthalic acid (PTA), and ethylene as the major products (FIG. 1C). The model substrate 1,2-ethanediol dibenzoate (1) is first used for process optimization and mechanistic studies (FIG. 2, paths (a)-(c)). As noted above, this air- and moisture-stable catalyst can be easily separated and reused without the need for solvents and without loss of activity.

Experimental

Materials and Methods

All manipulations of reagents were carried out in oven-dried reaction vessels unless otherwise noted. Reactions of esters and polyethylene terephthalate (PET) were carried out in cylindrical reactors (16×150 mm) and (25×200 mm), respectively, under 1 bar $H_2$ atmosphere equipped with rubber septa, and an $H_2$ gas delivery balloon, with heating supplied by a dry bath metal block. Higher pressure reactions were performed in a 10 mL HEL Pressure Reactor (Model SS316, HEL Limited, UK)) equipped with a stir bar, capable of reaching a maximum temperature of 300° C., maximum pressure of 750 psi (50 bar), and maximum stirring rate of 3000 rpm. Ethyl benzoate, vinyl benzoate, phenyl benzoate, 1,2-ethanediol dibenzoate, ethylene glycol monobenzoate were purchased from Sigma-Aldrich. PET powder (300 m) was purchased from Goodfellow. Deuterated $d_4$-1,2-ethanediol dibenzoate (1-$d_4$) was synthesized according to a known procedure for 1,2-ethanediol dibenzoate (1) (M. K. Grachev, et al. *Russ. J. Gen. Chem.* 2011, 81, 2129-2135). $d_4$-ethylene glycol ($HOCD_2CD_2OH$) was used instead of $H_4$-ethylene glycol. $C/MoO_2$ (3.23 wt % Mo) was prepared and fully characterized as described previously using $(dme)MoO_2Cl_2$ (dme=1,2-dimethoxyethane) and activated carbon. (A. R. Mouat, et al., *ACS Catalysis* 2016, 6, 6762-6769.)

Physical and Analytical Measurements

NMR spectra were recorded on a Varian Bruker Avance III HD system equipped with a TXO Prodigy probe (500 MHz) spectrometer. Chemical shifts (6) for $^1H$ are referenced to internal solvent. The head space in reactors were first collected using a 10 mL airtight syringe, and then manually injected to gas chromatography (or GC, model: Agilent 7890A, equipped with flame ionization detector, or FID). The gaseous products were separated by an Agilent PLOT-Q capillary column and then analyzed by FID. He is used as the carrier gas in GC. XPS spectra were collected at the Keck II facility at Northwestern University with a Thermo Scientific ESCALAB 250Xi spectrometer, equipped with an Al K alpha radiation source and electron flood-gun, at a pressure of $8×10^{-8}$ mbar with a pass energy of 50 eV. Binding energies were referenced against that of adventitious carbon, which was set at 284.8 eV. Typically, a 500 ms dwell time and 20 scans were used for each Mo spectrum. Spectra were normalized using Origin.

General Procedure

General set-up for hydrogenolysis reactions. A cylindrical reactor (tube) was charged with $C/MoO_2$ and the ester or PET in an ester group to Mo mole ratio of 20:1 to 1000:1. The tube was sealed with a rubber septum and pierced with a needle connected to a gas delivery gas delivery balloon. The tube and gas delivery balloon were carefully purged with the reaction gas, $H_2$ or Ar, five times, charged with $H_2$ or Ar, and then heated without stirring. During the reaction, benzoic acid (for ester) or terephthalic acid (for PET) sublimed from the reaction zone and crystallized at the top of the tube. After the reaction was complete. 2 mL of $CD_2Cl_2$ (for ester reactions) or $d_6$-DMSO (for PET reactions) and mesitylene as an internal standard were added and 0.5 mL of the reaction mixture was charged into the NMR tube.

Procedures and NMR Spectra of Reactions Located in Table 1

Table 1 Entry 3

(1S)

Exactly 0.0592 g of 1 (dried over $CaH_2$) and 0.0325 g of $C/MoO_2$ (dried under vacuum at 225° C. for 24 h) in a 40:1 ester group to Mo mole ratio were charged into a 16×150 mm reaction tube inside a glove box and sealed with a septum. The septum was then pierced with a needle connected to a gas delivery balloon. The tube and gas delivery balloon were carefully purged with the $H_2$ five times, charged with $H_2$ and then heated without stirring at 220° C. for 19 h. After the reaction was complete, 2 mL of $CD_2Cl_2$ containing 0.0198 g of mesitylene was added and 0.5 ml of the reaction mixture was charged in the NMR tube. Product 2 was obtained in 84% yield. When 1 was used as received and $C/MoO_2$ was not dried and was stored in air, 2 was obtained in 75% yield.

Table 1 Entry 4

Exactly 0.0592 g of 1 (dried over $CaH_2$) and 0.0325 g of $C/MoO_2$ (dried under vacuum at 225° C. for 24 h) in a 40:1 ester group to Mo mole ratio were charged in a 16×150 mm reaction tube inside a glove box and sealed with a septum. The septum was then pierced with a needle connected to a gas delivery balloon. The tube and gas delivery balloon were carefully purged with the Ar five times, charged with Ar, and then heated without stirring at 220° C. for 19 h. After the reaction was complete, 2 ml of $CD_2Cl_2$ containing 0.0196 g of mesitylene was added and 0.5 ml of the reaction mixture was charged in the NMR tube. Product 2 was obtained in 36% yield. When 1 was used as received and $C/MoO_2$ was not dried and was stored in air, 2 was obtained in 32% yield.

Table 1 Entry 5

Exactly 0.0300 g of $1$-$d_4$ and 0.0162 g of $C/MoO_2$ in a 40:1 ester group to Mo mole ratio were charged into a 16×150 mm reaction tube and sealed with a septum. The septum was then pierced with a needle connected to a gas delivery balloon. The tube and gas delivery balloon were carefully purged with the Ar five times, charged with Ar, and then heated without stirring at 220° C. for 16 h. After the reaction was complete, 2 ml of $CD_2Cl_2$ containing 0.0212 g of mesitylene was added and 0.5 ml of the reaction mixture was charged in the NMR tube. Product $2$-$d_1$ was obtained in 34% yield.

Table 1 Entry 6

Exactly 0.0301 g of $1$-$d_4$ and 0.0164 g of $C/MoO_2$ in a 40:1 ester group to Mo mole ratio were charged in a 16×150 mm reaction tube and sealed with a septum. The septum was then pierced with a needle connected to a gas delivery balloon. The tube and gas delivery balloon were carefully purged with the $H_2$ five times, charged with $H_2$, and then heated without stirring at 220° C. for 16 h. After the reaction was complete, 2 ml of $CD_2Cl_2$ containing 0.0180 g of mesitylene was added and 0.5 ml of the reaction mixture was charged in the NMR tube. Product $2$-$d_1$ was obtained in 75% yield.

Table 1 Entry 7

Air-stored 0.0414 g of commercial PET powder (300 m) and 0.0320 g of $C/MoO_2$ in a 40:1 ester group to Mo mole ratio were charged in a 25×200 mm reaction tube and sealed with a septum. The septum was then pierced with a needle connected to a gas delivery balloon. The tube and gas delivery balloon were carefully purged with the $H_2$ five times, charged with $H_2$, and then heated without stirring at 260° C. for 24 h. After the reaction was complete, 2 mL of $d_6$-DMSO containing 0.0202 g of mesitylene was added and 0.5 mL of the reaction mixture was charged in the NMR tube. Product 4 was obtained in 87% yield.

Table 1 Entry 8

(86%)
4

Waste-quality PET samples were prepared by cutting a drinking plastic bottle into small chips. Air-stored 0.0263 g of waste-quality PET chips and 0.0230 g (of C/MoO$_2$ in a 40:1 ester group to Mo mole ratio were charged in a 25×200 mm reaction tube and sealed with a septum. The septum was then pierced with a needle connected to a gas delivery balloon. The tube and gas delivery balloon were carefully purged with the H$_2$ five times, charged with H$_2$, and then heated without stirring at 260° C. for 24 h. After the reaction was complete, 2 mL of d$_6$-DMSO containing 0.0189 g of mesitylene was added and 0.5 mL of the reaction mixture was charged in the NMR tube. 4 was obtained in 86% yield.

Table 1 Entry 10

(7S)

(58%)
4

Air-stored 0.0418 g of commercial PET powder (300 m) and 0.0324 g of C/MoO$_2$ in a 40:1 ester group to Mo mole ratio were charged in a 25×200 mm reaction tube and sealed with a septum. The septum was then pierced with a needle connected to a gas delivery balloon. The tube and gas delivery balloon were carefully purged with the Ar five times, charged with Ar, and then heated without stirring at 260° C. for 24 h. After the reaction was complete, 2 mL of d$_6$-DMSO containing 0.0241 g of mesitylene was added and 0.5 mL of the reaction mixture was charged into the NMR tube. Product 4 was obtained in 58% yield.

Procedures and NMR Spectroscopy of Control Reactions

Heating of 1 without a Catalyst (8S)

No reaction

Exactly 0.0592 g of 1 (dried over CaH$_2$) was charged in a 16×150 mm reaction tube and sealed with a septum. The septum was then pierced with a needle connected to a gas delivery balloon. The tube and gas delivery balloon were carefully purged with the Ar five times, charged with Ar, and then heated without stirring at 260° C. for 19 h. After the reaction was complete, 2 mL of CD$_2$Cl$_2$ containing 0.0214 g of mesitylene was added and 0.5 mL of the reaction mixture was charged in the NMR tube. Product 2 was not observed.

Heating of 1 with Activated Carbon (AC)

(9S)

(<5%)
4

Exactly 0.1183 g (4.37*10$^{-4}$ mol) of 2 and 0.0650 g of activated carbon were charged in a 16×150 mm reaction tube and sealed with a septum. The septum was then pierced with a needle connected to a gas delivery balloon. The tube and gas delivery balloon were carefully purged with the Ar five times, charged with Ar, and then heated without stirring at 260° C. for 24 h. After the reaction was complete, 2 mL of CD$_2$Cl$_2$ containing 0.0312 g of mesitylene was added and 0.5 mL of the reaction mixture was charged in the NMR tube. Less than 5% of 4 was observed.

Heating Ethylene Glycol Monobenzoate in the Presence of C/MoO$_2$

(9S)

(32%)
2

Air-stored 0.0469 g of ethylene glycol monobenzoate and 0.0420 g of C/MoO$_2$ in a 20:1 ester group to Mo mole ratio were charged in a 16×150 mm reaction tube and sealed with a septum. The septum was then pierced with a needle connected to a gas delivery balloon. The tube and gas delivery balloon were carefully purged with the Ar five times, charged with Ar, and then heated without stirring at 220° C. for 24 h. After the reaction was complete, 2 mL of CD$_2$Cl$_2$ containing 0.0256 g of mesitylene was added and 0.5 mL of the reaction mixture was charged into the NMR tube. Product 2 was obtained in 32% yield together with 7% of 1. 1 was probably formed via esterification of the benzoic acid product with the starting ethylene glycol monobenzoate.

Hydrogenolysis of Vinyl Benzoate (10S)

Exactly 0.1050 g of vinyl benzoate (dried over $CaH_2$) and 0.0420 g of $C/MoO_2$ (dried under vacuum at 225° C. for 24 h) in a 50:1 ester group to Mo mole ratio were charged in a 16×150 mm reaction tube inside a glove box and sealed with a septum. The septum was then pierced with a needle connected to a gas delivery balloon. The tube and gas delivery balloon were carefully purged with the $H_2$ five times, charged with $H_2$, and then heated without stirring at 220° C. for 22 h. After the reaction was complete, 2 mL of $CD_2Cl_2$ containing 0.0371 g of mesitylene was added and 0.5 mL of the reaction mixture was charged in the NMR tube. Product 2 was obtained in 76% yield.

Hydrogenolysis of Phenyl Benzoate (11S)

Exactly 0.0468 g of phenyl benzoate (dried over $CaH_2$) and 0.0469 g of $C/MoO_2$ (dried under vacuum at 225° C. for 24 h) in a 16.6:1 ester group to Mo mole ratio were charged in a 16×150 mm reaction tube inside a glove box and sealed with a septum. The septum was then pierced with a needle connected to a gas delivery balloon. The tube and gas delivery balloon were carefully purged with the $H_2$ five times, charged with $H_2$, and then heated without stirring at 220° C. for 22 h. After the reaction was complete, 2 mL of $CD_2Cl_2$ containing 0.0251 g of mesitylene was added and 0.5 mL of the reaction mixture was charged into the NMR tube. Product 2 was obtained in 69% yield.

Heating Ethyl Benzoate in the Presence of $C/MoO_2$ (12S)

Method a

Air-stored 0.0349 g of ethyl benzoate and 0.0346 g of $C/MoO_2$ in a 20:1 ester group to Mo mole ratio were charged in a 16×150 mm reaction tube and sealed with a septum. The septum was then pierced with a needle connected to a gas delivery balloon. The tube and gas delivery balloon were carefully purged with the Ar five times, charged with Ar, and then heated without stirring at 220° C. for 17 h. After the reaction was complete, 2 mL of $CD_2Cl_2$ containing 0.0204 g of mesitylene was added and 0.5 mL of the reaction mixture was charged in the NMR tube. Product 2 was obtained in 8% yield.

Method b

Exactly 0.1050 g of ethyl benzoate (dried over $CaH_2$) and 0.0400 g of $C/MoO_2$ in a 50:1 ester group to Mo mole ratio were charged in a sealed 75 mL high pressure glass flask. The flask was purged with the Ar five times, charged with Ar (1 atm), and then heated with stirring at 220° C. for 20 h. After the reaction was complete, 2 mL of $CD_2Cl_2$ containing 0.0577 g of mesitylene was added and 0.5 mL of the reaction mixture was charged in the NMR tube. Product 2 was obtained in <5% yield.

Hydrogenolysis of Ethyl Benzoate (13S)

Method a

Air-stored 0.0373 g of ethyl benzoate and 0.0376 g of $C/MoO_2$ in a 20:1 ester group to Mo mole ratio were charged in a 16×150 mm reaction tube and sealed with a septum. The septum was then pierced with a needle connected to a gas delivery balloon. The tube and gas delivery balloon were carefully purged with the $H_2$ five times, charged with $H_2$, and then heated without stirring at 220° C. for 17 h. After the reaction was complete, 2 mL of $CD_2Cl_2$ containing 0.0189 g of mesitylene was added and 0.5 mL of the reaction mixture was charged in the NMR tube. Product 2 was obtained in 15% yield.

Method b

Exactly 0.1050 g of ethyl benzoate (dried over $CaH_2$) and 0.0400 g of $C/MoO_2$ in a 50:1 ester group to Mo mole ratio were charged in a sealed 75 ml high pressure glass flask. The flask was then purged with the $H_2$ five times, charged with $H_2$ (2 atm), and then heated with stirring at 220° C. for 20 h. After the reaction was complete, 2 mL of $CD_2Cl_2$ containing 0.0536 g of mesitylene was added and 0.5 ml of the reaction mixture was charged in the NMR tube. Product 2 was obtained in <5% yield.

Catalyst Recycling Experiments

During the course of the hydrogenolysis reaction, the product terephthalic acid (4) sublimed to the top of the reaction vessel and the $C/MoO_2$ catalyst remained at the bottom covered with unreacted PET. When the reaction was complete and most of the PET converted to 4, the $C/MoO_2$ catalyst returned to its original state, a free-flowing black powder. To recover the catalyst, the tube was inverted and the $C/MoO_2$ collected for reuse with fresh PET. It is important to emphasize that solvents were not used during the reaction and were not needed for catalyst recovery, making this process economical and environmentally friendly. The catalyst recycling experiments show that the catalyst can be used at least 4 times without significant deactivation, and in fact an increment in the overall yield was observed: 98% in the second and third runs and 85% in the fourth run (see Supplemental Information). A possible explanation for this is that after the first reaction the catalyst was still covered with some unreacted PET and product 4, which were transferred to the next experiment. This is supported by the lower yield obtained in the first run (80%) compared to the reaction in Scheme 5a (87%) in which 4 was extracted from the catalyst with DMSO. A more accurate way to assess whether the catalyst retained its activity is to calculate the overall combined yield of 4 obtained in all four reactions and to compare it with the yield obtained after 1 cycle (Table 1 entry 7, 87% of 4). The overall yield of 4 in the four catalyst recycling experiments was 90% (see Supplemental Information), indicating that the catalyst retained its activity after each run. The overall ester:Mo in these reactions was 160:1.

XPS Spectra

Sample preparation of catalyst used for XPS. After the reaction was complete, DMSO was added to dissolve the terephthalic acid product. The reaction mixture was then transferred into a centrifuge tube and centrifuged at a speed of 5000 rpm for 5 min. The supernatant was pipetted out, dimethyl sulfoxide (40 mL) was added to the mixture and centrifuged again. This process was repeated two more times to remove unreacted PET and products. Then acetone (3×40 mL) was used for centrifuge to remove residual dimethyl sulfoxide. The catalyst was then allowed to air dry.

XPS Results

The surface Mo of the fresh and spent catalysts were characterized by XPS (see Supplemental Information). No variation in the Mo binding energy was observed between the spent and fresh catalysts, indicating that the nature of the surface bound Mo species remained unchanged. The Mo 3d 5/2 peak was found to be 232.6 eV with a spin orbit splitting of 3.1 eV. These results are in good agreement with previously reported XPS data and supporting the hypothesis of the existence of a Mo(VI) dioxo species.

Consumption of 1 as a Function of Time

Monitoring the consumption of 1 as a function of time in the presence of 5 mol % C/MoO$_2$ under 1 atm of H$_2$ at 220° C. revealed a non-linear substrate consumption (see Supplemental Information). The rate that the reaction proceeded can be described as the change in the concentration of 1 with respect to time, and by plotting $\ln(C_1/C_0)$ ($C_1$=concentration of 1 during the reaction; $C_0$=initial concentration of 1) vs. time, a first-order dependence on the substrate concentration was observed (see Supplemental Information).

PET Recycling from Mixed Plastics (Table 1 Entry 9)

A mixed PET+isotactic polypropylene (PP) sample was prepared with a 1:0.1 ratio. This ratio was chosen based on the weight ratio of PET (bottle) and PP (cap) in a plastic beverage bottle. Air-stored 0.0402 g ($2.05*10^{-4}$ mol) of PET powder, 0.0039 g ($9.28*10^{-5}$ mol) of polypropylene (PP) (isotactic, average Mw~55,000) and 0.0315 g of C/Mo (=O)$_2$ in a 40:1 ester group to Mo mole ratio were charged in a dry mm reaction tube and sealed with a septum. The septum was then pierced with a needle connected to a gas delivery balloon. The tube and gas delivery balloon were carefully purged with the H$_2$ five times, charged with H$_2$, and then heated while stirring (500 rpm) at 260° C. for 24 h. After the reaction was complete, 2 mL of d$_6$-DMSO containing 0.0181 g of mesitylene was added and 0.5 mL of the reaction mixture was charged in the NMR tube. 6 was obtained in 87% yield. The solid residual (catalyst+PP) was separated from the reaction mixture and washed with 2 mL of d$_6$-DMSO. 2 mL of C$_2$Cl$_4$D$_2$ (TCE) were then added to the solid residual and heated at 150° C. until most of the PP dissolved. The mixture was then filtered to remove the heterogenous catalyst. 0.5 mL of the filtrate was charged in the NMR tube.

Results

For the remainder of the text and FIGS. 1A-6, "1" is used to designate the diester; "2" is used to designed the C/Mo(=O)(OH)(H) complex; "3" is used to designate benzoic acid; "4" is used to designate vinyl benzoate; and "5" is used to designate terephthalic acid.

Figure 2:
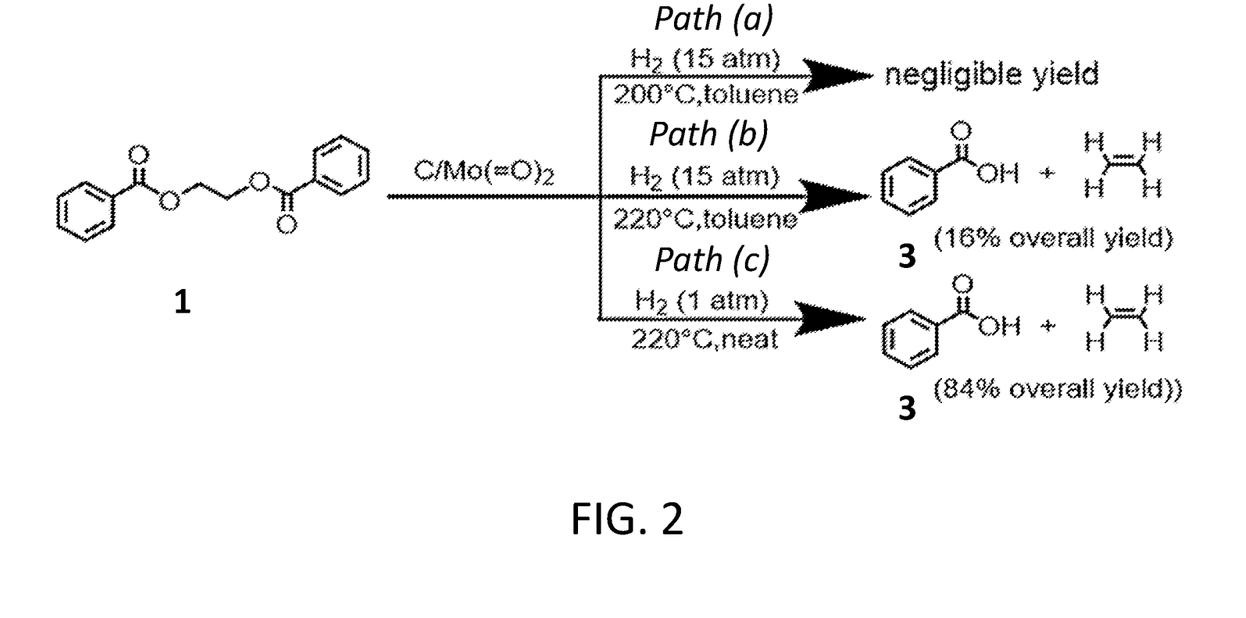
FIG. 2, paths (a)-(c), shows a schematic of C/MoO$_2$ catalyzed hydrogenolytic deconstruction of diester 1.

Toluene solutions of 1 were only hydrogenated at significant rates above 220° C./15 atm H$_2$ to afford benzoic acid (3) in 16% overall yield and ethylene, assayed by gas chromatography (FIG. 2, path (a) and Table 1, entry 1; FIG. 2, path (b) and Table 1, entry 2). This is likely due to the fact that Co/MoO$_2$ reacts with H$_2$ only above 220° C./15 atm H$_2$ to yield the putative complex, C/Mo(=O)(OH)(H) (2; by EXAFS and TPD). Interestingly, when the reaction was performed without solvent, 91% of 1 was consumed and an 84% yield of 3 was obtained in 19 h under only 1 atm of H$_2$ (FIG. 2, path (c); Table 1, entry 3). Monitoring neat 1 consumption as a function of time revealed a first-order dependence on the substrate concentration (see Supporting Information for details).

TABLE 1

C/MoO$_2$ catalyzed deconstruction of 1 and PET.

| Entry | Polyester | Time (h) | Temp. (° C.) | Ester:Mo (mol) | Conv. (%) | Isolated Yield (%) |
|---|---|---|---|---|---|---|
| 1 | 1 [a] | 24 | 200 | 40:1 | 0 | 0 |
| 2 | 1 [a] | 72 | 220 | 40:1 | 24 | 16 |
| 3 | 1 [b] | 19 | 220 | 40:1 | 91 | 84 |
| 4 | 1 [b, c] | 19 | 220 | 40:1 | 50 | 46 |
| 5 | 1-d$_4$ [c] | 16 | 220 | 40:1 | 35 | 30 |
| 6 | 1-d$_4$ | 16 | 220 | 40:1 | 71 | 65 |
| 7 | PET | 24 | 260 | 40:1 | N.D. | 87 |
| 8 | PET [d] | 24 | 260 | 40:1 | N.D. | 86 |
| 9 | PET + PP | 24 | 260 | 40:1 | N.D. | 87 |

TABLE 1-continued

C/MoO$_2$ catalyzed deconstruction of 1 and PET.

| Entry | Polyester | Time (h) | Temp. (° C.) | Ester:Mo (mol) | Conv. (%) | Isolated Yield (%) |
|---|---|---|---|---|---|---|
| 10 | PET [c] | 24 | 260 | 40:1 | N.D. | 58 |
| 11 | PET | 24 | 260 | — | N.D. | 9 |
| 12 | PET [e] | 96 | 260 | 160:1 | N.D. | 90 |
| 13 | PET | 96 | 260 | 100:1 | N.D. | 85 |

C/MoO$_2$ (3.23 wt % Mo), 1, and PET stored in air, solventless, 1 atm H$_2$. Conversions and ester yields determined by $^1$H NMR using mesitylene internal standard; products confirmed by $^{13}$C NMR.
[a] Reactions in toluene under 15 atm H$_2$, 500 rpm;
[b] Mo catalyst dried at 225° C. overnight and diester 1 dried over CaH$_2$;
[c] under Ar;
[d] Used beverage bottle PET.
[e] After each 24 h fresh PET added to C/MoO$_2$ catalyst.

Figure 3:
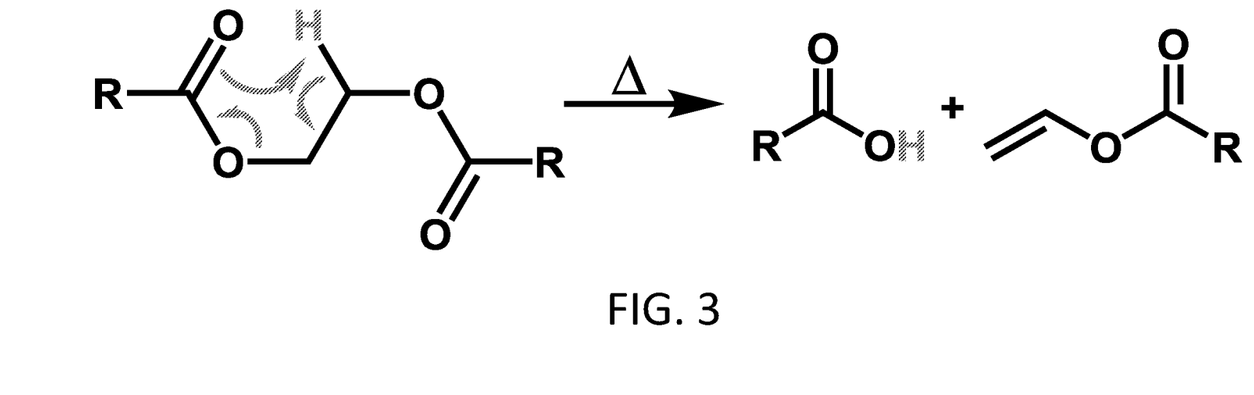
FIG. 3 shows a schematic of a β-heterolytic scission thermolysis pathway for polyesters.
Figure 4:
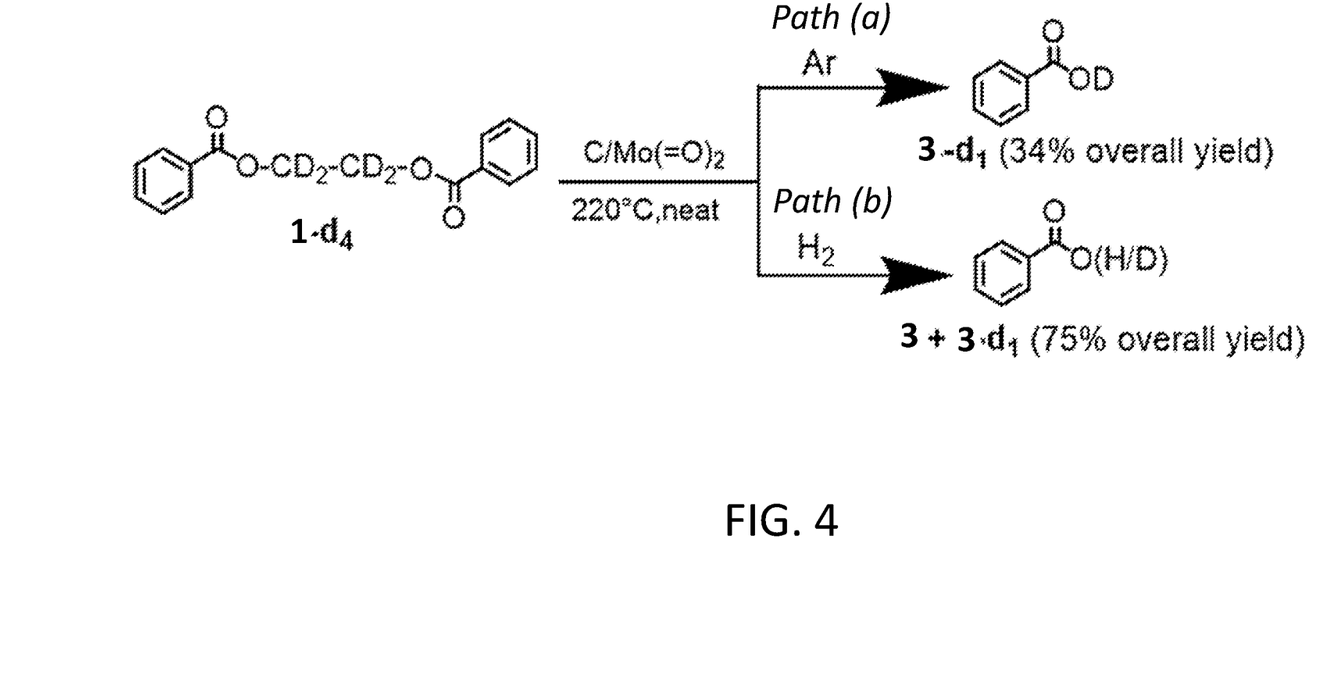
FIG. 4, paths (a)-(b), shows a schematic of C/MoO$_2$-catalyzed cleavage of deuterated diester 1-d$_4$ to benzoic acid under Ar (FIG. 4, path (a)) or H$_2$ (FIG. 4, path (b)).

In polyester polymers having β-hydrogen atoms, the major thermolytic degradation pathway (T>300° C.) is a β-scission (also known as retro-hydroalkoxylation) yielding carboxylic acid and vinyl fragments (FIG. 3). This reaction proceeds via a thermal syn E$_i$ elimination mechanism involving a six-membered transition state in which the bridging glycol 0-C bond is cleaved and the 3-H atom migrates to the carbonyl oxygen (FIG. 3).

In the catalytic hydrogenolysis of diester 1 (FIG. 2, paths (a)-(c)), formation of benzoic acid (3) and ethylene implies that the reaction may proceed via C—O scission β to the carbonyl carbon atom similar to that in FIG. 3. In principle, if a β-scission step is occurring, H$_2$ should not be required. Indeed, when 1 was heated at 220° C. in the presence of the catalyst under Ar instead of H$_2$, a 36% yield of 3 was obtained (Table 1, entry 4). In (3-scission, vinyl benzoate (4) is also expected; however, it was not observed by NMR spectroscopy, presumably due to its high reactivity at 220° C. Further mechanistic support for a β-scission step was obtained by performing analogous experiments with d$_4$-1, 2-ethanediol dibenzoate (1-d$_4$). When 1-d$_4$ was reacted with C/MoO$_2$ under argon, only deuterated benzoic acid (3-d$_1$) was obtained in 34% yield by NMR (FIG. 4, path (a); Table 1, entry 5). The complete disappearance of the PhC(O)O—H signal in $^1$H NMR argues that only deuterated 3-d$_1$ was formed, supporting the H/D source as the glycol bridge, and consistent with β-scission. Note that diester 1 was thermally stable at 220° C. and no decomposition was observed within 24 h, indicating that C/MoO$_2$ catalyzes the β-scission of 1. However, when the reaction was carried out under H$_2$, both 3 and 3-d$_1$ were obtained as assayed by $^1$H and $^2$H NMR, respectively. The total yield of 3+3-d$_1$ was 75% (FIG. 4, path (b); Table 1, entry 6). The formation of 3 as well as the higher overall yield obtained under H$_2$ indicates that in addition to β-scission, an additional pathway was operative. As noted above, H$_2$ reacted with C/MoO$_2$ to produce adsorbate 2; it is plausible that 2 mediated the formal hydrogenolysis of intermediate vinyl benzoate (4) to 3 and ethylene. This hypothesis is supported by an independent experiment (C/Mo(═O)$_2$, 220° C., 1 atm of H$_2$) in which 4 was converted to 3 and ethylene in 74% yield.

Figure 5A:
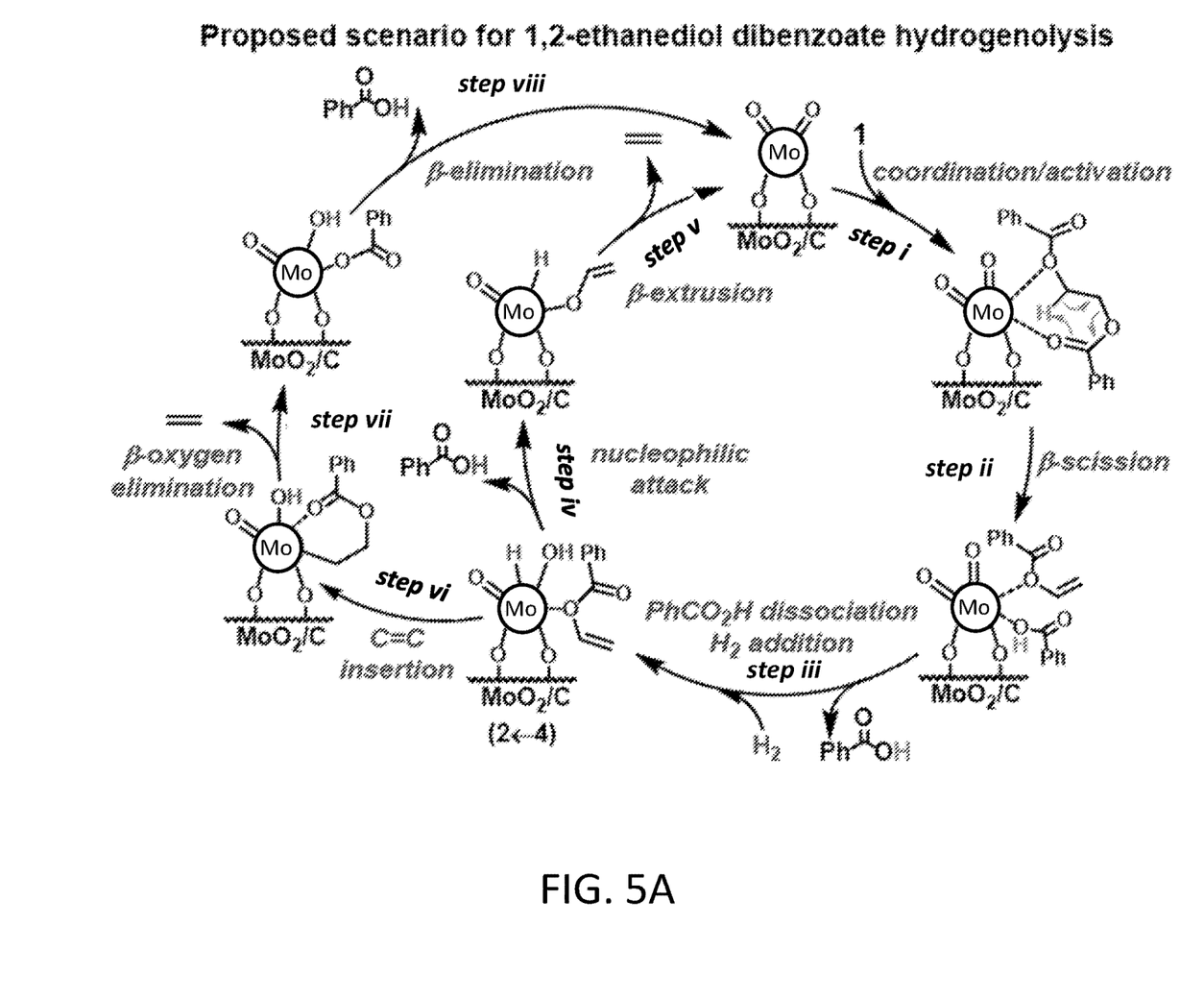
FIG. 5A, steps i-viii, FIG. 5B, paths (a)-(b), and FIG. 5C, paths (a)-(c), show schematics of the proposed diester hydrogenolysis reaction mechanism (FIG. 5A, steps i-viii) and control reactions for (FIG. 5B, paths (a)-(b)) C—O β-scission step; and for (FIG. 5C, paths (a)-(c)) hydroxide nucleophilic attack.
Figures 5B, 5C:
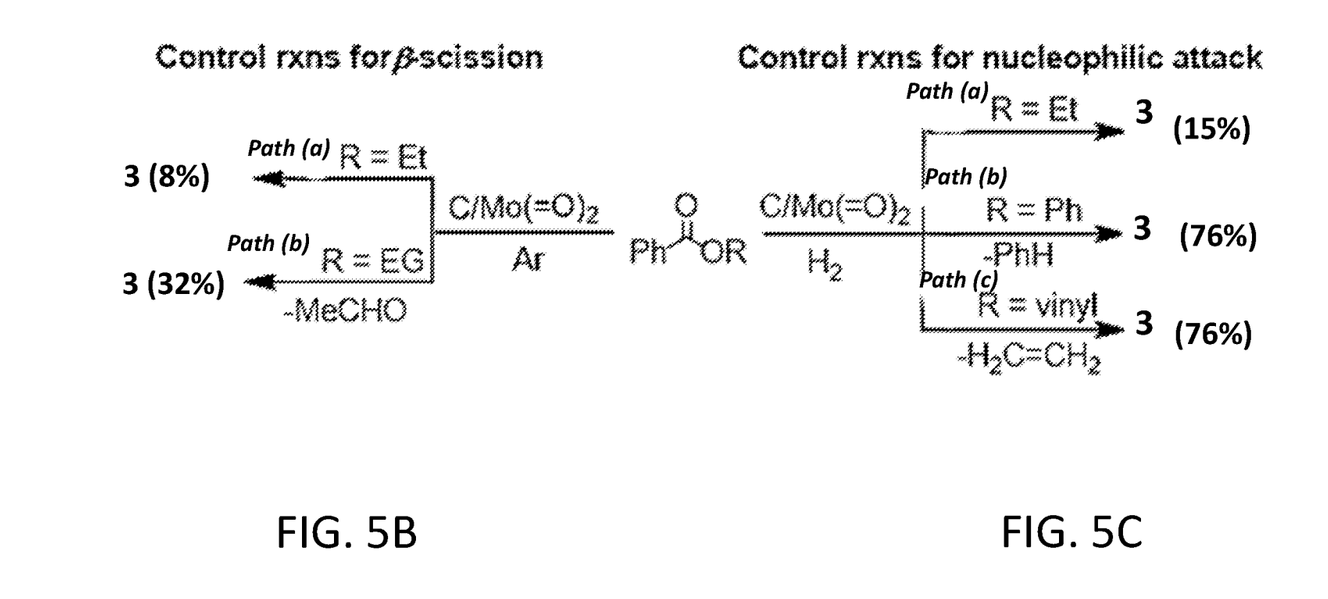
Figure 6:
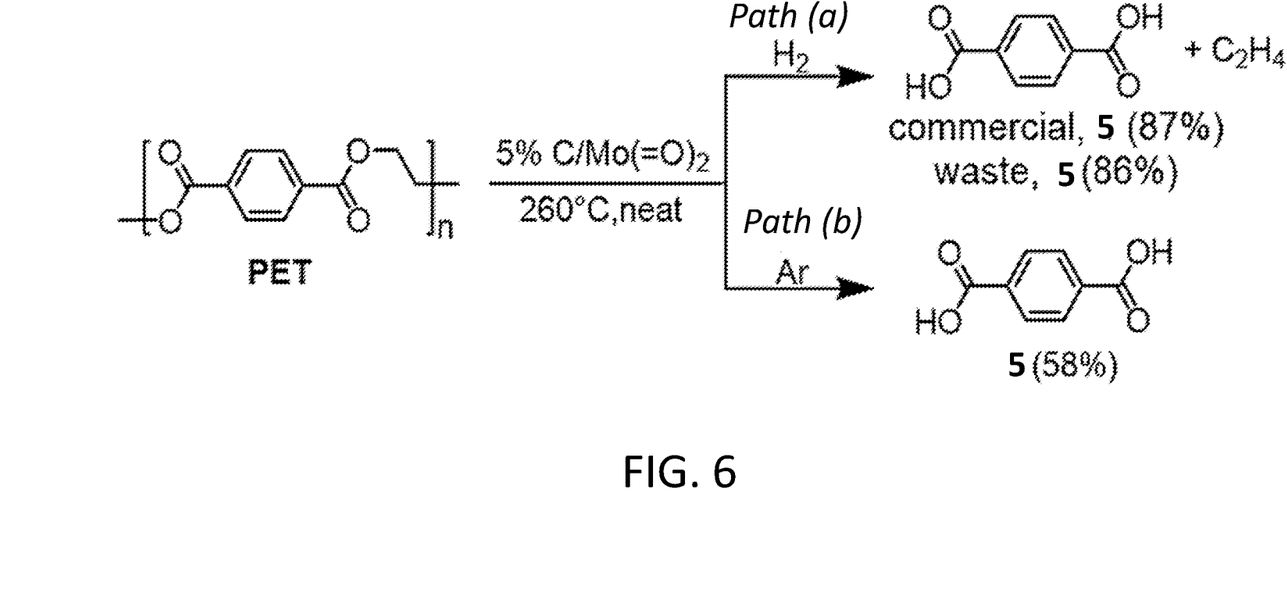
FIG. 6, paths (a)-(b), shows a schematic for C/MoO$_2$-catalyzed depolymerization of PET to terephthalic acid and ethylene.

From the above information, the scenario in FIG. 5A, steps i-viii, was proposed for the formal catalytic hydrogenolysis of substrate 1. FIG. 5A, step i: The diester carbonyl and alkoxy oxygen atoms of 1 coordinate to the Mo center, generating a well-precedented hexacoordinate dioxo-Mo complex (FIG. 5A, step i). This bidentate coordination/preorganization appears to be crucial for the subsequent β-scission, and is supported both by the poor activity of ethyl benzoate (FIG. 5B, path (a)), lacking a second glycol binding site (~8% yield of 3), and by good activity for ethylene glycol monobenzoate, yielding 32% of 3 and the expected acetaldehyde (FIG. 5B, path (b)). FIG. 5A, step ii: 0-scission of the alkoxy C—O bond generating benzoic acid (3) and vinyl benzoate (4). The bidentate coordination probably assists in pre-organizing the required transition state. FIG. 5A, step iii: H$_2$ adds across the Mo═O bond yielding Mo—OH and Mo—H bonds with release of benzoic acid (FIG. 5A, step iii). In principle, both Mo—OH and Mo—H moieties could react with vinyl benzoate 4. FIG. 5A, step iv: Hydroxide attack at the ester carbonyl generates 3 and formation of a C/Mo(═O)H(OCH═CH$_2$) species. This step is plausible considering the known leaving group ability of the alkoxy vinyl substituent. This is further supported by two control experiments with esters having a poor (ethyl benzoate) and good (phenyl benzoate) alkoxy leaving groups (FIG. 5C, paths (a)-(c)). Under identical reaction conditions, low conversion is observed with ethyl benzoate (8%) (FIG. 5C, path (a)) and higher conversion for phenyl benzoate (69% of 3) (FIG. 5C, path (b)). Note that 74% yield of 3 is obtained when vinyl benzoate (4) is used (FIG. 5C, path (c)). FIG. 5A, step v: β-elimination of ethylene from C/Mo(═O)H(OCH═CH$_2$) completes the catalytic cycle. FIG. 5A, steps vi-viii: alternatively, the C═C bond of 4 inserts into the Mo—H in complex 2, yielding a metal alkyl which then undergoes a β-oxygen elimination to produce ethylene and a C/Mo(═O)OH(OCOPh) species, completing the catalytic cycle after β-elimination to 3. Mo—H mediation of olefin elimination from vinyl or allyl esters has precedent.

Next, the depolymerization/hydrogenolysis of polyethylene terephthalate (PET) was investigated to determine whether diester 1 is a realistic model. Since the reaction was to be conducted with neat PET, the temperature was raised to near the PET melting point (260° C.). Note that 87% yields of terephthalic acid (5) and ethylene were obtained from commercial PET powder under 1 atm of H$_2$ in 24 h (FIG. 6, path (a); Table 1, entry 7). An overall yield of 5 (86%) was achieved for waste PET from a beverage bottle (Table 1, entry 8). Furthermore, when the reaction was conducted with a common plastics mixture, i.e., PET+ isotactic polypropylene (iPP; simulating a bottle cap), 5 sublimed out in 87% yield (Table 1, entry 9), unaffected by the added PP which remained in the reactor. As for the reaction of diester 1, a 58% yield of 5 was obtained when the reaction was carried out under Ar, (FIG. 6, path (b)) and Table 1, entry 10) suggesting that the reaction proceeded via the pathway of FIG. 5A, steps i-viii. When PET was treated under identical conditions in the absence of catalyst, only a 9% yield of 5 was obtained, probably via partial PET thermolysis, highlighting the importance of the C/MoO$_2$ catalyst (Table 1, entry 11). One of the attractions of the heterogeneous C/MoO$_2$ catalyst is that it can be easily recycled and reused without losing activity (Table 1, entry 12). The overall yield of 5 in four catalyst recycling experiments was 90% (see supplemental information). Furthermore, XPS analysis of fresh and spent C/MoO$_2$ samples indicated that the surface-bound Mo species remained unchanged (see supplemental information).

CONCLUSIONS

In conclusion, it was demonstrated that the earth-abundant, air- and moisture-stable carbon-supported single-site molybdenum-dioxo complex, C/Mo(═O)$_2$, catalyzed the depolymerization of polyethylene terephthalate (PET) under 1 atmosphere of H$_2$ in a solvent-free medium, to selectively afford the starting monomer terephthalic acid (5) and ethylene in high yields. This process is effective for both commercial and waste PET, and the catalyst exhibits high stability and recyclability. Moreover, the reaction was not affected by the presence of polypropylene. Mechanistic studies with the model compound 1,2-ethanediol dibenzoate (1), suggest that the reaction proceeds via a C—O β-scission step followed by hydrogenolysis of the intermediate vinyl benzoate (4). C/MoO$_2$ is therefore a very attractive catalyst for chemical recycling of polyesters since it is selective, thermally, moisture and air-stable, inexpensive, and recyclable.

Information referenced with the label "supplemental," and the like may be found in the accompanying Appendix of U.S. provisional patent application No. 63/008,948, that was filed Apr. 13, 2020, the entire contents of which are incorporated herein by reference.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for depolymerizing a polyester, the method comprising heating a polyester at a temperature and for a period of time in the presence of a supported metal-dioxo catalyst to induce hydrogenolysis of ester groups in the polyester and provide monomers of the polyester, wherein the monomers comprise a dicarboxylic acid.

2. The method of claim 1, wherein the method is carried out in the presence of H$_2$.

3. The method of claim 1, wherein the dicarboxylic acid is an aromatic dicarboxylic acid or a heterocyclic dicarboxylic acid.

4. The method of claim 1, wherein the dicarboxylic acid is terephthalic acid.

5. A method for depolymerizing a polyester, the method comprising heating a polyester at a temperature and for a period of time in the presence of a supported metal-dioxo catalyst to induce hydrogenolysis of ester groups in the polyester and provide monomers of the polyester, wherein the monomers comprise a dicarboxylic acid, and further wherein the hydrogenolysis further provides an alkene.

6. The method of claim 1, wherein the polyester is a polymerization product of reactants comprising an aromatic dicarboxylic acid or a heterocyclic dicarboxylic acid, and an aliphatic diol.

7. The method of claim 6, wherein the monomers comprise the aromatic dicarboxylic acid or the heterocyclic dicarboxylic acid and the hydrogenolysis further provides an alkene corresponding to the aliphatic diol.

8. The method of claim 1, wherein the polyester is polyethylene terephthalate (PET), polybutylene terephthalate (PBT), polytrimethylene terephthalate (PTT), polyethylene naphthalate (PEN), polyethylene 2,5-furandicarboxylate (PEF), polyethylene terephthalate glycol-modified (PETG), poly(1,4-cyclohexylenedimethylene terephthalate) (PCT), or combinations thereof.

9. The method of claim 8, wherein the polyester is PET.

10. The method of claim 9, wherein the monomers comprise terephthalic acid and the hydrogenolysis further provides ethylene.

11. The method of claim 2, wherein the H$_2$ is at a pressure of no more than 50 atm.

12. The method of claim 11, wherein the pressure is no more than 10 atm.

13. A method for depolymerizing a polyester, the method comprising heating a polyester at a temperature and for a period of time in the presence of a supported metal-dioxo catalyst to induce hydrogenolysis of ester groups in the polyester and provide monomers of the polyester, wherein the method is carried out in the absence of a solvent.

14. A method for depolymerizing a polyester, the method comprising heating a polyester at a temperature and for a period of time in the presence of a supported metal-dioxo catalyst to induce hydrogenolysis of ester groups in the polyester and provide monomers of the polyester, wherein the metal of the supported metal-dioxo catalyst is a Group 6 transition metal.

15. The method of claim 14, wherein the Group 6 transition metal is Cr, Mo, W, or combinations thereof.

16. The method of claim 1, wherein the metal of the supported metal-dioxo catalyst is a Group 6 transition metal; the method is carried out in the presence of H$_2$ at a pressure of no more than 50 atm; the method is carried out in the absence of a solvent; and the hydrogenolysis further provides an alkene.

17. The method of claim 16, wherein the dicarboxylic acid is terephthalic acid.

18. The method of claim 1, further comprising recovering the catalyst and carrying out the method one or more additional times with the recovered catalyst.

19. The method of claim 1, further comprising recovering the monomers and repolymerizing the monomers to form a polymer.

20. The method of claim 1, wherein the polyester is provided in a mixture with a non-polyester polymer and the non-polyester polymer remains intact after the method.

* * * * *